Sept. 4, 1928.  1,682,740
S. S. COLT
RETAINING MEANS FOR CONCRETE FORMS
Filed Oct. 11, 1926   2 Sheets-Sheet 1
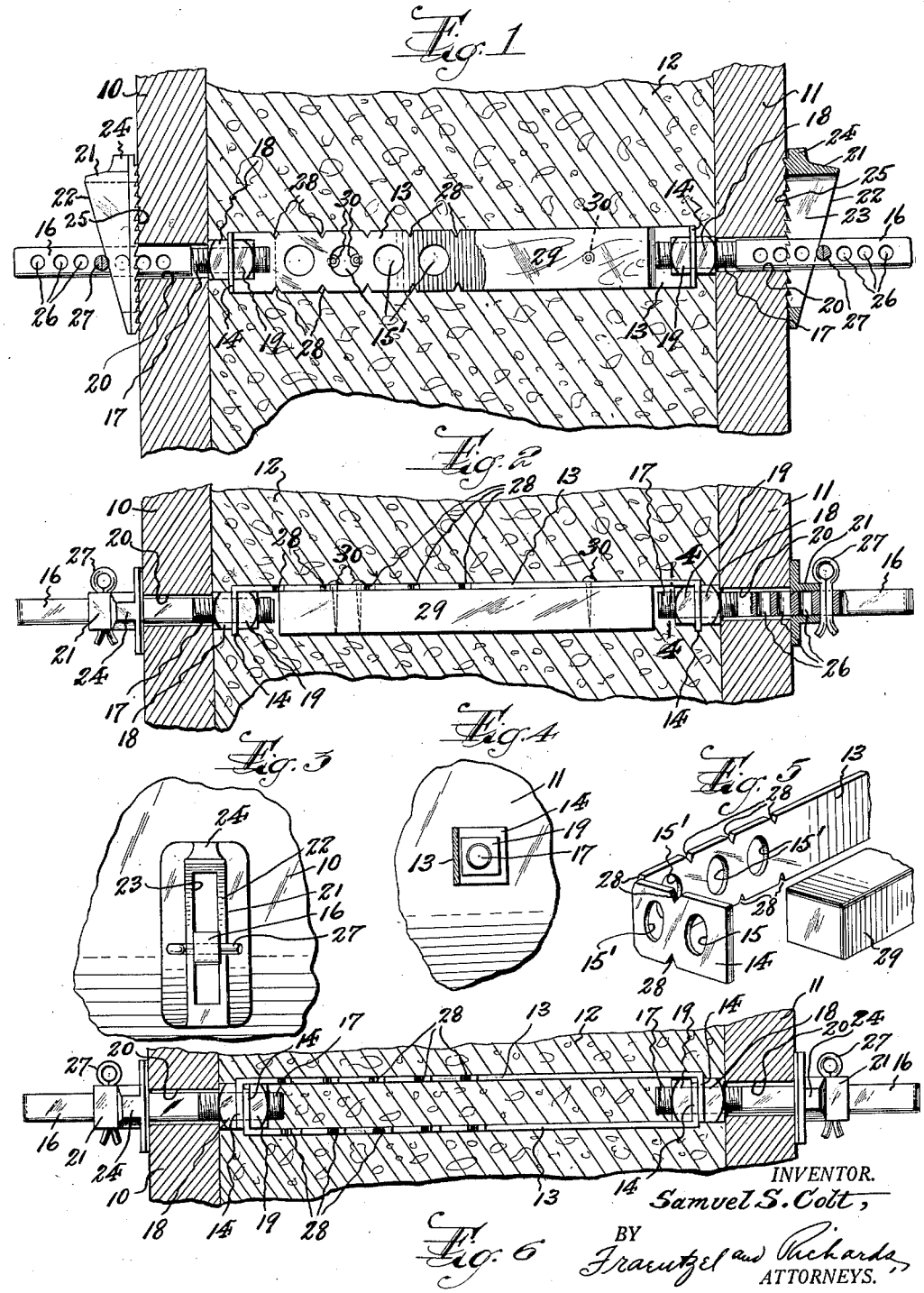
INVENTOR.
Samuel S. Colt,
BY
Kraeutzel and Richards
ATTORNEYS.

Sept. 4, 1928.                                                          1,682,740
S. S. COLT
RETAINING MEANS FOR CONCRETE FORMS
Filed Oct. 11, 1926          2 Sheets-Sheet 2
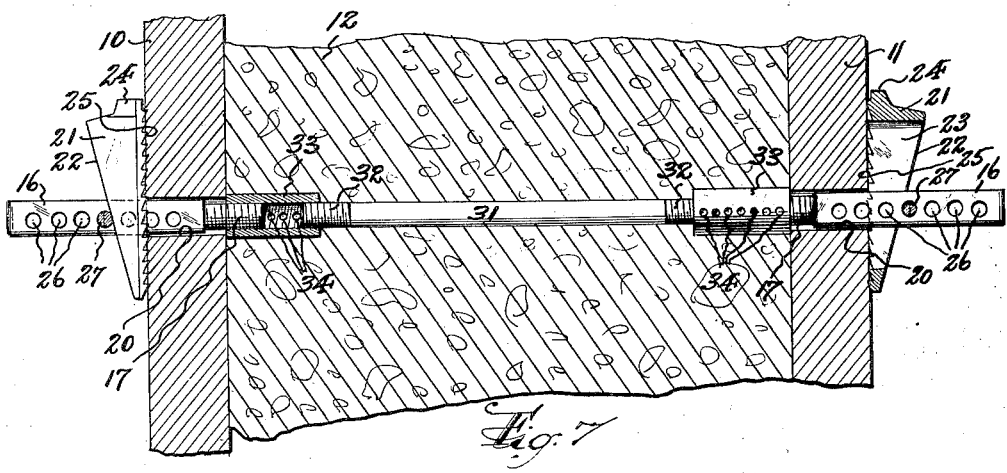
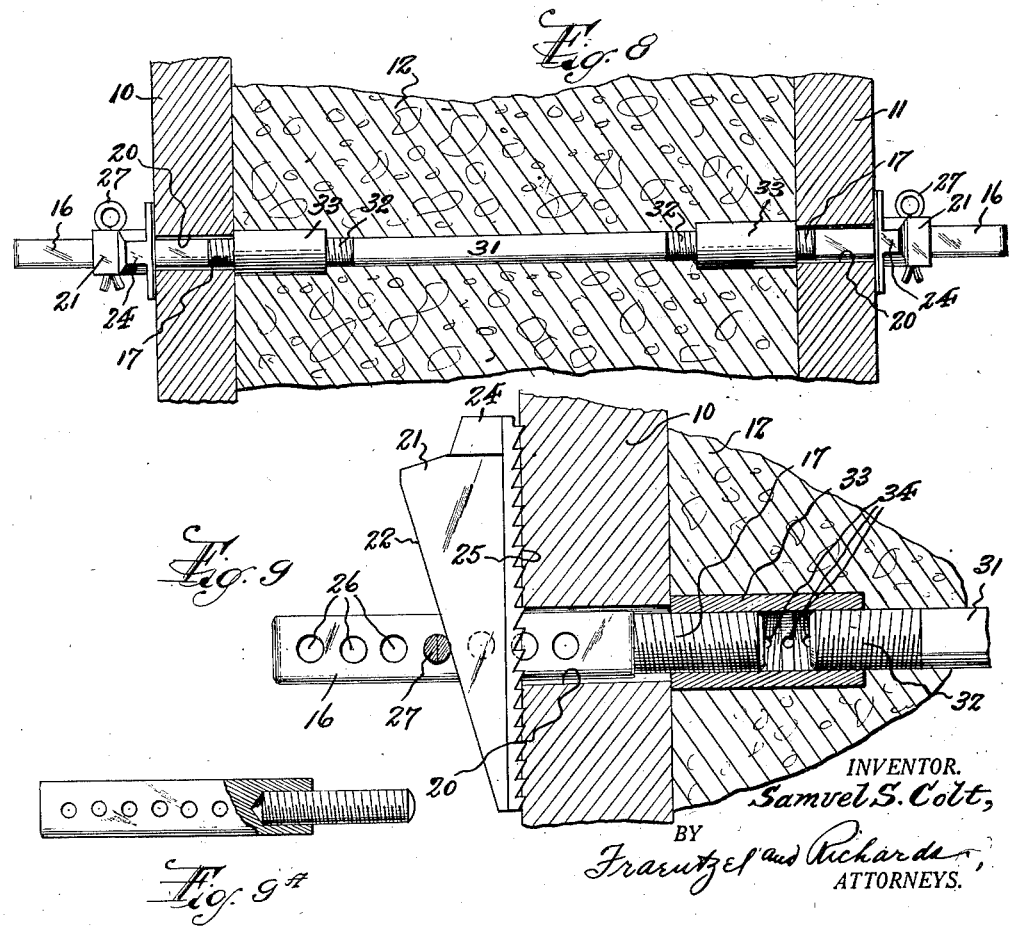

Patented Sept. 4, 1928.

1,682,740

UNITED STATES PATENT OFFICE.

SAMUEL S. COLT, OF ORANGE, NEW JERSEY.

RETAINING MEANS FOR CONCRETE FORMS.

Application filed October 11, 1926. Serial No. 140,740.

This invention relates to devices for positioning and retaining form members used to shape concrete structures; and the invention has reference, more particularly, to a novel construction of retaining means for holding form members in various operative positions.

The invention has for its principal objects to provide a simple and inexpensive spreader means which may be easily and quickly varied in length on the job, as circumstances may require, without necessity of employing special tools; and to further provide detachable devices for retaining the form members in operative positions while the concrete is being poured.

The invention has for a further object to provide a cheap but efficient variable spreader means, which remains imbedded in the finished concrete structure, in combination with novel devices for retaining said spreader means and the form members in operative assembled relation, but which may be readily detached from the spreader means and removed when the concrete structure is completed, so that said retaining devices may be used over and over again; thus furnishing a very economical arrangement for the purposes in view.

Other objects of this invention, not at this time more particularly enumerated, will be clearly understood from the following detailed description of the same.

The invention is clearly illustrated in the acompanying drawings, in which:—

Figure 1 is a vertical section through said form members between which concrete has been formed, illustrating in side elevation and part section one form of the novel variable spreader and retaining means made according to the present invention; and Figure 2 is a similar horizontal section, showing the said variable spreader and retaining means in plan and part horizontal section.

Figure 3 is an end view, looking toward the exterior face of a form member; Figure 4 is a detail cross-section, taken on line 4—4 in Figure 2; Figure 5 is a fragmentary perspective of a variable spreader member and reenforcing member therefor, said view illustrating the manner in which the length of the spreader member may be varied or adjusted.

Figure 6 is a view similar to that shown in Figure 2, but illustrating a modified arrangement of the variable spreader means.

Figure 7 is a view similar to that shown in Figure 1, but illustrating a modified form of variable spreader means; and Figure 8 is a view similar to that shown in Figure 2, but showing said modified form of variable spreader means.

Figure 9 is an enlarged detail vertical section, showing the means for varying the length of said modified form of variable spreader means.

Figure 9ᴬ illustrates a modified form of keeper member, in which the shank is formed as a separate part screwed into the inner end of said keeper member.

Similar characters of reference are employed in all of the hereinabove described views, to indicate corresponding parts.

Referring first to Figures 1 to 5 inclusive of the drawings, I have illustrated therein one form of the novel variable spreader retaining means, made according to and embodying the principles of the present invention; the same being shown in Figures 1 and 2 operatively assembled with form members or walls 10 and 11, to space the latter apart and at the same time retain them in desired position to shape the concrete 12 which is shown poured therebetween.

The reference character 13 indicates one form of variable spreader element, made of sheet metal, to provide a longitudinal body portion having at its respective ends laterally turned anchoring lugs 14, which are provided with perforations 15. The reference character 16 indicates keeper members or links which are provided at their inner ends with threaded shanks 17; said shanks 17 being either an integral part of the keeper member, or a separate part screwed thereinto, as shown in Figure 9ᴬ of the drawings. Said keeper members or links 16 are each provided, in connection with their threaded shanks 17, with adjustable abutment nuts 18, against which the perforate anchoring lugs 14 of the spreader element 13 are engaged, when the shanks 17 are passed inwardly therethrough to operatively assemble the said spreader element 13 and keeper members 16 together. Said shanks 17 are also provided on their extremities with lock nuts 19, which may be screwed home against the inner side of said anchoring lugs 14, to thereby clamp the latter against the abutment nuts 18, and thus securely retain the keeper members and spreader element in operative assembled relation.

The said form members or walls 10 and 11 are furnished with suitably disposed opposed perforations or openings 20, so that when assembling the spreader element 13 between said form members or walls, the keeper members 16 extend outwardly through said openings 20, so as to project exteriorly from the outer sides of said form members or walls 10 and 11, while the inner sides of the latter butt against the abutment nuts 18. As thus disposed, the spreader element 13 extends between the form members or walls 10 and 11, and serves to retain the same against inward movement one toward the other, thereby holding the same spread apart at the distance corresponding to the thickness of concrete structure desired to be obtained. In order to hold the form members or walls 10 and 11 in abutting relation to the spreader means thus provided, and at the same time securely retain said members or walls against outward displacement, I provide a novel construction of locking wedge to cooperate with the exteriorly projecting portions of said keeper members or links 16. Each wedge comprises a body 21 having a perpendicular or vertical rear face and an upwardly and outwardly inclined front face 22. Said wedge body 21 is provided with a longitudinal slot 23 extending therethrough from its rear face to its front face, and formed in connection with the keeper end of said wedge body 21 is a driving boss 24. Preferably the rear vertical face of said wedge body 21 is provided with a series of transverse serrations forming gripping teeth 25. A wedge body 21 is engaged over the exteriorly projecting end of each keeper member or link 16, the latter projecting outwardly through the longitudinal slot 23 of the former, so that the vertical toothed rear faces of the wedge bodies respectively abut against the outer faces of the form members or walls 10 and 11. Each keeper member or link 16 is provided throughout its length with a series of longitudinally spaced transverse openings or perforations 26, in which may be selectively arranged a cross-pin 27, preferably in the form of a cotter-pin as shown, which consists in longitudinally parallel resilient portions which frictionally engage the sides of the openings or perforations, and are thus retained against displacement from the keeper members. The cross-pins 27 are selectively positioned in connection with the exteriorly projecting ends of said keeper members or links 16, so as to be spaced outwardly from the exterior faces of the form members or walls 10 and 11 at a sufficient distance to permit of the insertion of the wedge bodies between the latter and said cross-pins 27. When the parts are thus assembled, the wedges 21 are pounded down to securely interlock the assembled parts together, the toothed rear or inner faces of the wedge being at the same time caused to enter into a strong frictional engagement with the form members or walls 10 and 11, which tends to firmly hold the same against accidental shifting or loosening from the operative positions to which they have been thus driven. From the above description it will be apparent, that the novel spreader and retaining means will very efficiently serve to both space the form members or walls apart, while at the same time holding the same against displacement from such desired spaced relation.

Inasmuch as it is frequently desired to vary the spacing of form members or walls, and in order under such circumstances, to avoid necessity of providing a number of sizes of the spreader elements, the present invention also includes means whereby the above described spreader elements are rendered variable in length at will. With such object in view, each spreader element 13 is provided in its body, to extend from an end thereof, with a series of longitudinally spaced perforations 15′. These perforations 15′ are spaced apart at distances corresponding to a given unit of measurement. For example, said perforations 15′ may be spaced one inch apart so that reduction of the maximum length of the spreader element may be made on the basis of one or more inches, without necessity of making special measurements, by merely laterally bending the end of the spreader element at a selected point between the proper perforations 15′, to thus shorten the same to the desired extent. The portion thus bent is turned at right angles to the main body, thus providing an anchoring lug 14 adapted to present a perforation 15′ in operative position to receive the shank of the keeper member or link 16; all of which may be easily understood from an inspection, more especially, of Figure 5 of the drawings. In order to facilitate the bending of the spreader element at any selected point intermediate the perforations 15′, I provide the opposite longitudinal margins of the same with transversely aligned indentations or notches 28, which, by rendering the spreader body slightly less resistant to lateral bending strains at such points, thus predetermine the lines of bend at the properly selected points.

In the use of the novel variable spreader elements above described, it may be desirable at times to reenforce the same against accidental longitudinal distortion. In such case I may provide reenforcing strips or blocks 29, preferably made of wood, which are registered against a face of the spreader element and suitably secured thereto by fastening nails 30, or other suitable fastening means, driven through the latter and into the former, as shown in Figures 1 and 2.

Another way in which a spreader means may be obtained which is calculated to better resist longitudinal distortion is illustrated in Figure 6 of the drawings. In such case, I employ the spreader elements 13 in pairs, with their anchoring lugs 14 overlapping and aligned together to receive the shanks of the keeper members or links and the abutment and lock nuts associated therewith. By this arrangement the pair of spreader elements 13 are disposed in parallel, and mutually reenforce each other against possible distorting strains.

When form members or walls 10 and 11 have been both spaced apart and secured in cooperating relation by the above described novel variable spreader and retaining means, and the concrete 12 poured therebetween and set, and it is desired to dismantle the form, the wedge bodies 21 are tapped on their lower ends to loosen the same, after which the cross-pins 27 are withdrawn, to permit the wedge bodies to be removed from the keeper members or links 16. The keeper members or links 16 are thereupon turned axially to screw out their shanks 17 from the nuts 18 and 19, thus uncoupling the former from the spreader elements 13, which remain imbedded in the shaped concrete structure. It will thus be evident that the keeper members or links 16 and their cooperating wedges may be used over and over again, and that the relatively inexpensive spreader element alone remains in the completed structure. After the keeper members or links and their wedges have been dismantled, the abutment nuts 18 may be withdrawn from the resultant concrete structure, and the cavities remaining may be filled or pointed up with cement flush with the exterior surface of said structure.

It may be here pointed out that it is not always necessary or essential to employ the abutment nuts 18, since, if desired, the anchoring lugs 14 of the spreader elements 13 may be caused to directly abut the inner surfaces of the form members or walls 10 and 11, in which case only the lock nuts 19 are necessary to interconnect the spreader element and keeper members or links 16 together.

Referring now to Figures 7 to 9 inclusive of the drawings, I have shown therein a somewhat modified form of variable spreader and retaining means. In such modified form, the spreader means comprises a rod 31 of desired predetermined length, and provided with threaded portions 32 at its respective ends. Arranged to screw upon the respective threaded ends of said rod 31 are internally threaded sleeves 33, provided in their sides with longitudinally spaced perforations 34 spaced apart at distances corresponding to a desired unit of measurement upon the basis of which adjustments or variations of the length of the spreader is desired to be made. By adjusting one or both of said sleeves 33 on the threaded end portions 32 of the rod 31, until the end of the latter is registered with the selected perforation 34, through which said end may be viewed, the length of the spreader means may be varied to meet the conditions of spacing of the form members or wall 10 or 11 which are required. When the spreader means is thus adjusted, the keeper members or links 16 are attached thereto by screwing the shanks 17 thereof into the outer ends of the sleeves. The form members or walls 10 and 11 are thereupon assembled so that the keeper members or links 16 project exteriorly through the openings 20, to thereupon receive the cross pins 27 and wedges 21, which serve both to position the form members or walls 10 and 11 in abutting relation against the outer ends of the sleeves, to thus spread or space the same apart, as well as to retain the same against displacement from such operatively set relation.

In Figure 7 I have shown the internal threads of the sleeves 33 as right hand threads extending through the length of the sleeve, but I may also, if desired, provide such threads in the form of right and left threads extending respectively into the sleeve from opposite ends thereto, as shown in Figure 9.

I am aware that some changes, other than those already above specified, may be made in the arrangements and combinations of parts making up my novel variable spreader and retaining means, as well as in the details of the construction of said parts, without departing from the scope of the present invention as defined in the appended claims. Hence, I do not limit my present invention to the exact arrangements and combinations of parts as described in the foregoing specification, nor do I confine myself to the exact details of the construction of said parts as illustrated in the accompanying drawings.

I claim:—

1. In combination with form members, adjustable spreader means intermediate and within said form members to hold the same in predetermined spaced relation, and perforate retaining means independent of but detachably connected with the ends of said spreader means mounted on said retaining means to cooperate with said form members to hold the latter against displacement, and a split pin selectively engaged through a perforation of said retaining means to hold said latter means in place.

2. In combination with form members, adjustable spreader means intermediate said form members to hold the same in predetermined spaced relation, transversely perforate keeper members having threaded shanks at their inner ends, means for detachably securing said shanks with the ends of said spreader means so that said keeper members project exteriorly through said form members, cross-pins engaged through the exterior portions of said keeper members, and retaining wedges engaged intermediate said cross-pins and said form members.

3. In combination with form members, adjustable spreader means intermediate said form members to hold the same in predetermined spaced relation, transversely perforate keeper members having threaded shanks at their inner ends, means for detachably securing said shanks with the ends of said spreader means so that said keeper members project exteriorly through said form members, split pins consisting in longitudinally parallel resilient portions engageable through said perforate keeper members so as to be frictionally retained against displacement therefrom, and retaining wedges engaged intermediate said pins and said form members.

4. In combination with form members, adjustable spreader means intermediate said form members to hold the same in predetermined spaced relation, transversely perforate keeper members having threaded shanks at their inner ends, means for detachably securing said shanks with the ends of said spreader means so that said keeper members project exteriorly through said form members, cross-pins engaged through the exterior portions of said keepers members, and retaining wedges engaged intermediate said cross-pins and said form members, said wedges having gripping means on their form opposing faces.

5. In combination with form members, a variable spreader to hold said form members in predetermined spaced relation, said spreader comprising a metallic body having at one end a laterally projecting perforate anchor lug, the opposite end portion of said body having a longitudinal row of perforations spaced apart at predetermined distance, said body being selectively bendable at points adjacent to each said perforation to both determine the length of the spreader and to form at the opposite end thereof a perforate anchor lug, and retaining means detachably connected with said anchor lugs and cooperating with said form members to hold the latter against displacement.

6. In combination with form members, a variable spreader to hold said form members in predetermined spaced relation, said spreader comprising a metallic body having at one end a laterally projecting perforate anchor lug, the opposite end portion of said body having a longitudinal row of perforations spaced apart at predetermined distance, said body being selectively bendable at points adjacent to each said perforation to both determine the length of the spreader and to form at the opposite end thereof a perforate anchor lug, transversely perforate keeper members having threaded shanks at their inner ends, said shanks being engageable through said perforate anchor lugs, means for detachably securing said shanks to said anchor lugs so that said keeper members project exteriorly through said form members, cross-pins engaged through the exterior portions of said keeper members, and retaining wedges engaged intermediate said cross-pins and said form members.

7. In combination with form members, a variable spreader to hold said form members in predetermined spaced relation, said spreader comprising a metallic body having at one end a laterally projecting perforate anchor lug, the opposite end portion of said body having a longitudinal row of perforations spaced apart at predetermined distance, said body being selectively bendable at points adjacent to each said perforation to both determine the length of the spreader and to form at the opposite end thereof a perforate anchor lug, transversely perforate keeper members having threaded shanks at their inner ends, said shanks being engageable through said perforate anchor lugs, means for detachably securing said shanks to said anchor lugs so that said keeper members project exteriorly through said form members, cross-pins engaged through the exterior portions of said keeper members, retaining wedges engaged intermediate said cross-pins and said form members, and said wedges having toothed gripping means on their form opposing faces.

8. In combination with form members, a variable spreader to hold said form members in predetermined spaced relation, said spreader comprising a metallic body having at one end a laterally projecting perforate anchor lug, the opposite end portion of said body having a longitudinal row of perforations spaced apart at predetermined distance, the opposite side margins of said body having indented notches at points adjacent to said perforations to predetermine selective lines of bend whereby bending of said body at a given point will both determine its length and form at the opposite end thereof a perforate anchor lug, and means for holding said spreader in operative position intermediate said form members.

9. In combination with form members, a variable spreader to hold said form members in predetermined spaced relation, said spreader comprising a metallic body having at one end a laterally projecting perforate anchor lug, the opposite end portion of said body having a longitudinal row of perforations spaced apart at predetermined distance, the opposite side margins of said body having indented notches at points adjacent to said perforations to predetermine selective lines of bend whereby bending of said body at a given point will both determine its length and form at the opposite end thereof a perforate anchor lug, a reenforcing means parallel with said body intermediate the anchor lugs of the latter, means to secure said reenforcing means and body together, and means for holding said spreader in operative position intermediate said form members.

10. In combination with form members, a variable spreader to hold said form members in predetermined spaced relation, said spreader comprising a metallic body having at one end a laterally projecting perforate anchor lug, the opposite end portion of said body having a longitudinal row of perforations spaced apart at predetermined distance, the opposite side margins of said body having indented notches at points adjacent to said perforations to predetermine selective lines of bend whereby bending of said body at a given point will both determine its length and form at the opposite end thereof a perforate anchor lug, transversely perforate keeper members having threaded shanks at their inner ends, said shanks being engageable through said perforate anchor lugs, means for detachably securing said shanks to said anchor lugs so that said keeper members project exteriorly through said form members, cross-pins engaged through the exterior portions of said keeper members, retaining wedges engaged intermediate said cross-pins and said form members.

11. In combination with form members, a variable spreader to hold said form members in predetermined spaced relation, said spreader comprising a metallic body having at one end a laterally projecting perforate anchor lug, the opposite end portion of said body having a longitudinal row of perforations spaced apart at predetermined distance, the opposite side margins of said body having indented notches at points adjacent to said perforations to predetermine selective lines of bend whereby bending of said body at a given point will both determine its length and form at the opposite end thereof a perforate anchor lug, a reenforcing means parallel with said body intermediate the anchor lugs of the latter, means to secure said reenforcing means and body together, transversely perforate keeper members having threaded shanks at their inner ends, said shanks being engageable through said perforate anchor lugs, means for detachably securing said shanks to said anchor lugs so that said keeper members project exteriorly through said form members, cross-pins engaged through the exterior portions of said keepers, retaining wedges engaged intermediate said cross-pins and said form members.

12. A variable spreader for spacing forms to receive concrete, comprising a metallic body having at one end a laterally projecting perforate anchor lug to receive means for connecting a form member with said end, the opposite end portion of said body having a longitudinal row of perforations spaced apart at predetermined distance, said body being selectively bendable at points adjacent to each perforation to both determine the length of the spreader and to form at the opposite end thereof a perforate anchor lug to receive means for connecting another form member with said opposite end.

13. A variable spreader for spacing forms to receive concrete, comprising a metallic body having at one end a laterally projecting perforate anchor lug to receive means for connecting a form member with said end, the opposite end portion of said body having a longitudinal row of perforations spaced apart at predetermined distance, opposite side margins of said body having indented notches at points adjacent to said perforations to predetermine selective lines of bend whereby bending of said body at a given point will both determine its length and form at the opposite end thereof a perforate anchor lug to receive means for connecting another form member with said opposite end.

14. A spreader device as defined in claim 11 having a reenforcing means parallel with its body intermediate the anchor lugs thereof, and means to serve said reenforcing means and body together.

15. A spreader device as defined in claim 12 having a reenforcing means parallel with its body intermediate the anchor lug thereof, and means to secure said reenforcing means and body together.

16. A retaining means for concrete forms, comprising a keeper element to project exteriorly through and from a form member, a cross-pin engaged through the exterior portion of said keeper element, means at the inner end of said keeper element to detachably couple the same with anchoring means, and a retaining wedge engaged intermediate said cross-pin and the exterior side of the form member.

17. A retaining means for concrete forms, comprising a keeper element to project exteriorly through and from a form member, said keeper element having longitudinally spaced transverse perforations, a cross-pin selectively engaged through a perforation in the exterior portion of said keeper element, a longitudinally projecting threaded shank at the inner end of said keeper element to detachably couple the same with suitable anchoring means, and a retaining wedge engaged intermediate said cross-pin and the exterior side of the form member.

18. A retaining means as defined in claim 16, in which the retaining wedge is provided with toothed gripping means on its form opposing face.

19. A retaining means as defined in claim 17, in which the retaining wedge is provided with toothed gripping means on its form opposing face.

In testimony, that I claim the invention set forth above I have hereunto set my hand this 6th day of October, 1926.

SAMUEL S. COLT.